G. M. L. McMillen.
Horse Rake.

No. 106,385. Patented Aug. 16, 1870.

Attest:

Inventor.
G. M. L. McMillen

United States Patent Office.

G. M. L. McMILLEN, OF DAYTON, OHIO.

Letters Patent No. 106,385, dated August 16, 1870.

IMPROVEMENT IN HORSE HAY-RAKES.

The Schedule referred to in these Letters Patent and making part of the same.

I, G. M. L. McMILLEN, of Dayton, in the county of Montgomery and State of Ohio, have invented an Improvement in Two-wheeled Horse-Rakes, of which the following is a specification.

The nature and object of my invention relates to that class of two-wheeled horse-rakes, whose teeth have a pivot attachment to the axle of the wheels, which is also the head of the rake, the teeth forming hinges for elevating the lifting-bar upon which the teeth are supported and held in position by springs. This improvement consists in holding the supporting-bar firmly in position, by automatic setting of the levers and lifting-bar, while the teeth are allowed to articulate upon bearings, to rise over obstacles while raking, without attention from the driver, and also, in providing means to elevate the rake at will.

A is a bell-crank lever, supported by bar $a$ upon the frame of the rake, to which it is connected by pivot $i$, on which it turns.

B is a link, which unites the upper end of the lever A, connected by joint $b$, with the head-leaver C by pivot-joint $c$.

C is the rake-head lever, which is hinged to the axle or to the rake-head itself, by pivot-joint $d$, and its lower end connected to the supporting or lifting-bar D. The lever C should be placed at such an angle as to have joint $c$ above the joint $d$, and the joint $b$, when in the position shown in fig. 1, should be above a line from $i$ to $c$, so as to support the rake against vertical pressure upon the teeth.

The bar O prevents the rotation of lever A beyond a fixed point, which should be just above the line $i'$ $c$, as the handle of the lever A is drawn backward by the joint. $b$ describes the arc of a circle turning on pivot $i$ for its center.

The link B, when the joint $c$ is depressed, causes the upper end of the lever $c$ to describe the arc of a circle, with $b$ for its center, and elevates the supporting or lifting-bar $d$ to which the teeth are attached, and lifts the teeth off the ground. The lever C acts as a hinge for the bar $d$ to rise upon. The link B with its hinge-joints allows the levers A and C to describe the respective arch of their circles. At the same time the desired movement or pressure is communicated from lever A to the rake through the lever C, and vice versa.

Figure 1:
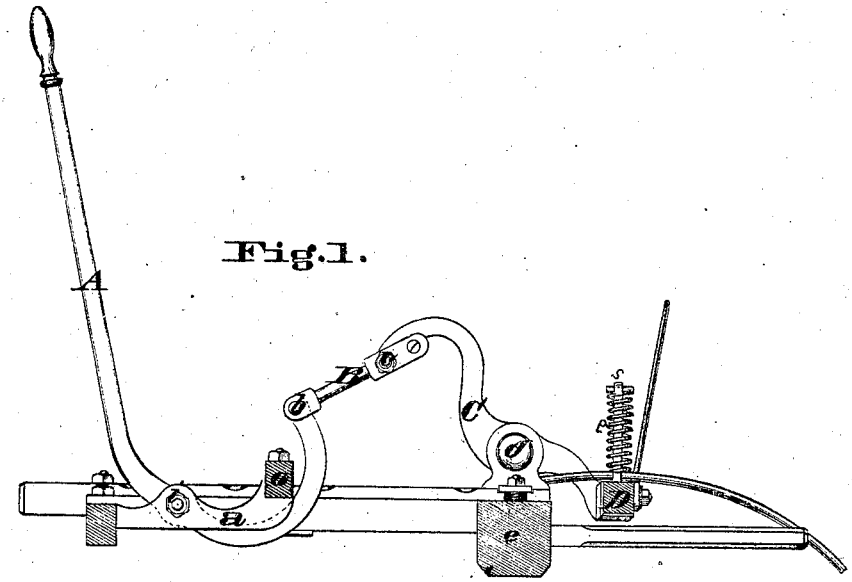
Figure 1 is a perspective view of the levers with a longitudinal section of the rake.
Figure 2:
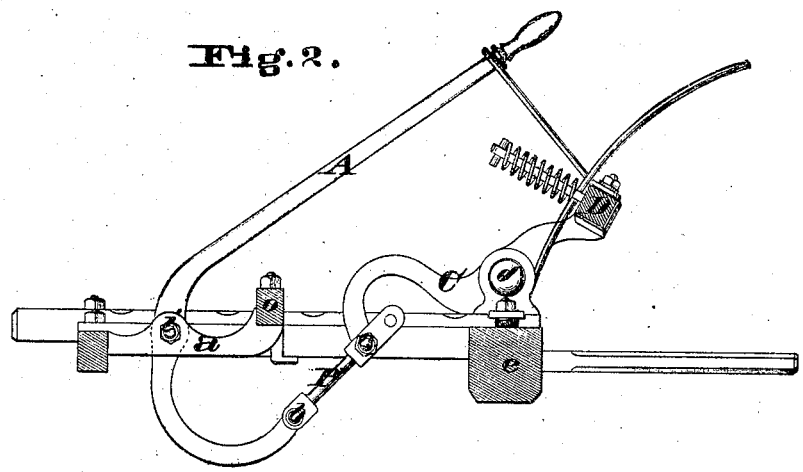
Figure 2 is the same view, with the rake elevated for transportation.

When the lever A is in the position shown in fig. 1, no amount of pressure upon the dragging end of the teeth will lift the rake, hence the attendant need not hold lever A or add any pressure to keep the rake down to its work, as the described arrangement of the levers A, link B, and lever C, effectually lock or brace the rake against pressure caused by the dragging of the teeth. When it is desired to elevate the rake to discharge the gathered load of hay, or for any cause, the attendant grasps the lever A (which should be near the driver's seat, as usually placed on sulky rakes,) and draws it backward. A slight motion owing to the arrangement of the levers, will be sufficient to discharge the hay. The weight of the rake will carry back the handle of the lever A to its place, carrying the joint $b$ above the line $i$ $c$, at which position the teeth of the rake are locked or set.

Having described my invention,

What I claim as new is—

The hinged lever C hinged upon the axle $c$, when combined with the bell-crank lever A, link B, and lifting-bar D, arranged to form an automatic lock for the bar D, all substantially as herein set forth.

G. M. L. McMILLEN.

Witnesses:
JOHN J. ACKERMAN,
J. O. CURTIS.